(12) United States Patent
Hashiguchi

(10) Patent No.: US 12,276,995 B2
(45) Date of Patent: Apr. 15, 2025

(54) POWER SUPPLY SYSTEM AND SEMICONDUCTOR INTEGRATED CIRCUIT DEVICE

(71) Applicant: ROHM CO., LTD., Kyoto (JP)

(72) Inventor: Shingo Hashiguchi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 62 days.

(21) Appl. No.: 18/485,517

(22) Filed: Oct. 12, 2023

(65) Prior Publication Data

US 2024/0160239 A1    May 16, 2024

(30) Foreign Application Priority Data

Nov. 10, 2022   (JP) .................... 2022-180068

(51) Int. Cl.
| | |
|---|---|
| G05F 1/62 | (2006.01) |
| G05F 1/575 | (2006.01) |
| G05F 1/613 | (2006.01) |
| H02M 3/155 | (2006.01) |

(52) U.S. Cl.
CPC .............. G05F 1/575 (2013.01); G05F 1/613 (2013.01); H02M 3/155 (2013.01)

(58) Field of Classification Search
None
See application file for complete search history.

(56) References Cited

U.S. PATENT DOCUMENTS

| | | | |
|---|---|---|---|
| 8,937,404 B1 * | 1/2015 | Ferris ................. | H02M 3/1584 |
| | | | 307/29 |
| 9,385,604 B2 * | 7/2016 | Yorozu ............... | H02M 3/1584 |
| 9,606,559 B2 * | 3/2017 | Ozawa ................ | H02M 3/1584 |
| 10,749,433 B2 * | 8/2020 | Kobayashi ........... | H02M 1/088 |
| 11,294,411 B1 * | 4/2022 | Narula ................. | G05F 1/575 |
| 11,789,480 B2 * | 10/2023 | Huang ................. | G05F 1/613 |
| | | | 307/15 |
| 11,804,777 B2 * | 10/2023 | Chen .................. | H02M 3/1584 |
| 2025/0030344 A1 * | 1/2025 | Park .................... | H02M 3/1584 |

FOREIGN PATENT DOCUMENTS

JP    2021-132447    9/2021

* cited by examiner

*Primary Examiner* — Thomas J. Hiltunen
(74) *Attorney, Agent, or Firm* — Fish & Richardson P.C.

(57) ABSTRACT

A power supply system includes a plurality of semiconductor integrated circuit devices, wherein a master among the plurality of semiconductor integrated circuit devices is configured to use a constant voltage to calibrate a first reference of a detection result of a current flowing through its own switching element, and a slave among the plurality of semiconductor integrated circuit devices is configured to use the constant voltage supplied from the master to calibrate a second reference of a detection result of a current flowing through its own switching element.

11 Claims, 5 Drawing Sheets

POWER SUPPLY SYSTEM AND SEMICONDUCTOR INTEGRATED CIRCUIT DEVICE

CROSS-REFERENCE TO RELATED APPLICATION

This application is based upon and claims the benefit of priority from Japanese Patent Application No. 2022-180068, filed on Nov. 10, 2022, the entire contents of which are incorporated herein by reference.

TECHNICAL FIELD

The present disclosure relates to a power supply system and a semiconductor integrated circuit device.

BACKGROUND

With evolution of packages in semiconductor integrated circuit devices, semiconductor integrated circuit devices for switching power supplies that incorporate switching elements have been increasing in current. However, there is a limit to allowable losses of packages. For this reason, development of a power supply system, in which a plurality of semiconductor integrated circuit devices for switching power supplies that incorporate switching elements is provided and operated in parallel, is progressing.

BRIEF DESCRIPTION OF DRAWINGS

The accompanying drawings, which are incorporated in and constitute a part of the specification, illustrate embodiments of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

In the present disclosure, a MOS field effect transistor refers to a field effect transistor having a gate structure that includes at least three layers of a "layer made of a conductor or a semiconductor such as polysilicon with a low resistance value," an "insulating layer," and a "P-type, N-type, or intrinsic semiconductor layer." That is, the gate structure of the MOS field effect transistor is not limited to the three-layer structure of metal, oxide, and semiconductor.

In the present disclosure, a reference voltage refers to a voltage that is constant in an ideal state, and in reality, is a voltage that may vary slightly due to a change in temperature, or the like.

In the present disclosure, a constant voltage refers to a voltage that is constant in an ideal state, and in reality, is a voltage that may vary slightly due to a change in temperature, or the like.

<Power Supply System According to Embodiment>

Figure 1:
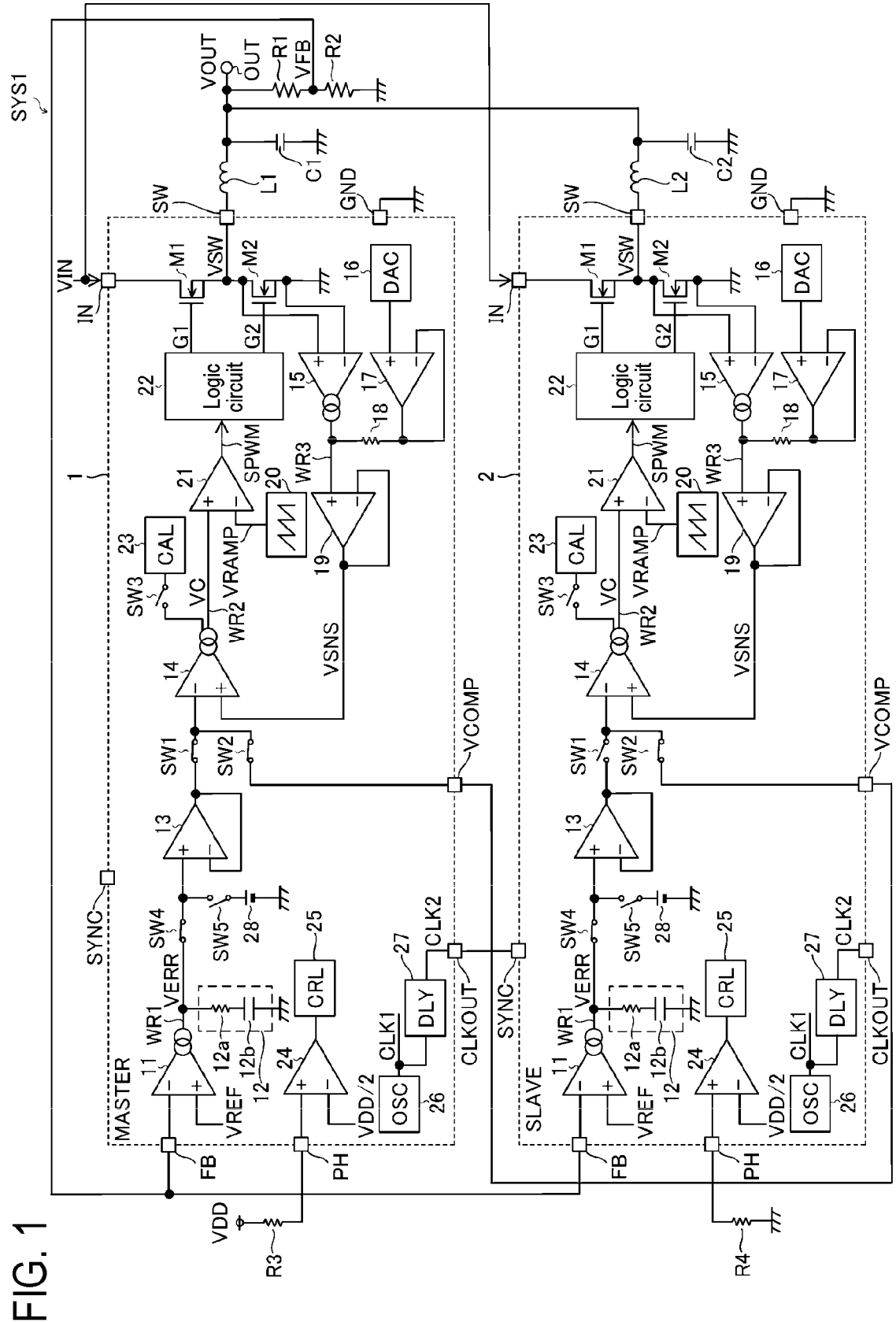
FIG. 1 is a diagram showing a schematic configuration of a power supply system according to an embodiment.

FIG. 1 is a diagram showing a schematic configuration of a power supply system SYS1 according to an embodiment. The power supply system SYS1 includes switching power supply ICs 1 and 2, and a plurality of discrete components externally connected to the switching power supply ICs 1 and 2.

The power supply system SYS1 includes an inductor L1 and an output capacitor C1 as discrete components externally connected to the switching power supply IC 1. The power supply system SYS1 includes an inductor L2 and an output capacitor C2 as discrete components externally connected to the switching power supply IC 2. The power supply system SYS1 includes feedback resistors R1 and R2 as discrete components externally connected in common to the switching power supply ICs 1 and 2.

The power supply system SYS1 is a step-down switching power supply system that operates the switching power supply ICs 1 and 2 in parallel to generate a desired output voltage VOUT from an externally supplied input voltage VIN.

Figure 2:
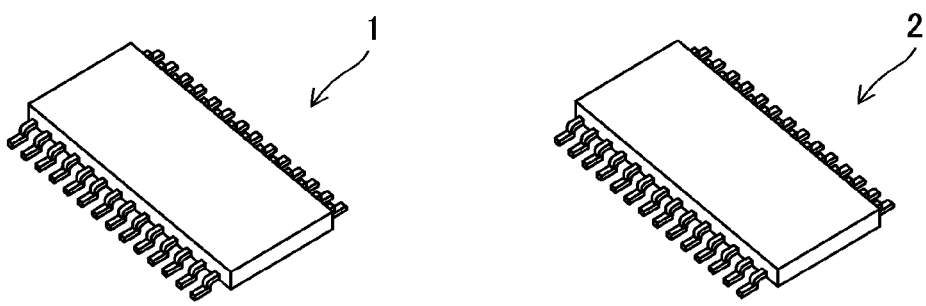
FIG. 2 is an external perspective view of a switching power supply IC.

The switching power supply ICs 1 and 2 are each electronic components formed by enclosing a semiconductor integrated circuit in a housing (package) made of resin, as shown in FIG. 2. A plurality of external terminals is provided and exposed on the housing of each of the switching power supply ICs 1 and 2. The plurality of external terminals includes a terminal IN, a terminal SW, a terminal GND, a terminal VCOMP, a terminal CLKOUT, a terminal PH, a terminal FB, and a terminal SYNC, which are shown in FIG. 1. Terminals other than those described above may also be included in the plurality of external terminals. The number of external terminals of each of the switching power supply ICs 1 and 2 and the external appearance of each of the switching power supply ICs 1 and 2 shown in FIG. 2 are merely examples.

Returning to FIG. 1, configurations of the switching power supply ICs 1 and 2 will be described.

The external configuration of the switching power supply ICs 1 and 2 will be described.

The input voltage VIN is supplied to the terminal IN of the switching power supply IC 1 from the outside of the switching power supply IC 1. The inductor L1 is interposed in series between the terminal SW of the switching power supply IC 1 and an output terminal OUT. That is, a first end of the inductor L1 is connected to the terminal SW of the switching power supply IC 1, and a second end of the inductor L1 is connected to the output terminal OUT. In addition, the output terminal OUT is connected to the ground via the output capacitor C1. In addition, the output terminal OUT is connected to a first end of the feedback resistor R1, and a second end of the feedback resistor R1 is connected to the ground via the feedback resistor R2. A connection node between the feedback resistors R1 and R2 is connected to the terminal FB of each of the switching power supply ICs 1 and 2. In addition, the terminal GND of each of the switching power supply ICs 1 and 2 is connected to the ground.

The input voltage VIN is supplied to the terminal IN of the switching power supply IC 2 from the outside of the switching power supply IC 2. The inductor L2 is interposed in series between the terminal SW of the switching power supply IC 2 and the output terminal OUT. That is, a first end of the inductor L2 is connected to the terminal SW of the switching power supply IC 2, and a second end of the inductor L2 is connected to the output terminal OUT. In addition, the output terminal OUT is connected to the ground via the output capacitor C2.

The terminal VCOMP of the switching power supply IC 1 is connected to the terminal VCOMP of the switching power supply IC 2. The terminal PH of the switching power supply IC 1 is connected to a first end of a pull-up resistor R3. A constant voltage VDD is applied to a second end of the pull-up resistor R3. The terminal PH of the switching power supply IC 2 is connected to a first end of a pull-down resistor R4. A second end of the pull-down resistor R4 is connected to the ground. The terminal CLKOUT of the switching power supply IC 1 is connected to the terminal SYNC of the switching power supply IC 1.

Internal configurations of the switching power supply ICs 1 and 2 will be described. The internal configuration of the switching power supply IC 1 and the internal configuration of the switching power supply IC 2 are the same. Therefore, the internal configuration of the switching power supply IC 1 will be described as a representative.

The switching power supply IC 1 includes an error amplifier 11, a phase compensation circuit 12, a buffer amplifier 13, a differential amplifier 14, switches SW1 and SW2, a differential amplifier 15, a DAC (Digital Analog Converter) 16, a buffer amplifier 17, a resistor 18, a buffer amplifier 19, a ramp voltage generation circuit 20, a comparator 21, a logic circuit 22, and transistors M1 and M2 configured as N-channel MOS field effect transistors. Each of the transistors M1 and M2 is an example of a switching element.

The error amplifier 11 is a current output type transconductance amplifier. The inverting input terminal of the error amplifier 11 is supplied with a voltage applied to the terminal FB (a feedback voltage VFB which is a divided voltage of the output voltage VOUT), and the non-inverting input terminal of the error amplifier 11 is supplied with a reference voltage VREF. The reference voltage VREF is a DC voltage having a predetermined positive voltage value and is generated by a reference voltage generation circuit (not shown) in the switching power supply IC 1. The error amplifier 11 outputs from its own output terminal an error current signal corresponding to a difference between the feedback voltage VFB and the reference voltage VREF. Charges generated by the error current signal are input and output with respect to a wiring WR1 which is an error signal wiring. Specifically, when the feedback voltage VFB is lower than the reference voltage VREF, the error amplifier 11 outputs a current based on the error current signal from the error amplifier 11 toward the wiring WR1 so that a potential of the wiring WR1 increases. When the feedback voltage VFB is higher than the reference voltage VREF, the error amplifier 11 draws a current based on the error current signal from the wiring WR1 toward the error amplifier 11 so that the potential of the wiring WR1 decreases. As an absolute value of the difference between the feedback voltage VFB and the reference voltage VREF increases, a magnitude of the current based on the error current signal also increases.

The phase compensation circuit 12 is provided between the wiring WR1 and the ground, receives an input of the error current signal, and generates an error voltage VERR on the wiring WR1. The phase compensation circuit 12 is provided to compensate a phase of the error voltage VERR. The phase compensation circuit 12 includes a series circuit of a resistor 12a and a capacitor 12b. Specifically, a first end of the resistor 12a is connected to the wiring WR1, and a second end of the resistor 12a is connected to the ground via the capacitor 12b. By appropriately setting a resistance value of the resistor 12a and a capacitance value of the capacitor 12b, the phase of the error voltage VERR can be compensated to prevent oscillation of an output feedback loop.

The buffer amplifier 13 receives the error voltage VERR when a switch SW4, which will be described later, is turned on. An output terminal of the buffer amplifier 13 is connected to a first end of the switch SW1. A first end of the switch SW2 is connected to the terminal VCOMP. A second end of each of the switches SW1 and SW2 is connected to an inverting input terminal of the differential amplifier 14. The provision of the buffer amplifier 13 makes it difficult for the phase of the error voltage VERR to change, even though the switches SW1 and SW2 and the terminal VCOMP are provided in a subsequent stage of the error amplifier 11.

The differential amplifier 14, like the error amplifier 11, is a current output type transconductance amplifier. When the switch SW1 and the switch SW4, which will be described later, are turned on, the error voltage VERR applied to the wiring WR1 is supplied to a non-inverting input terminal of the differential amplifier 14, and a sense voltage VSNS output from the buffer amplifier 19 is supplied to the inverting input terminal of the differential amplifier 14. The differential amplifier 14 outputs from its own output terminal a current signal corresponding to a difference between the error voltage VERR and the sense voltage VSNS. Charges generated by the current signal are input and output with respect to a wiring WR2. Specifically, when the error voltage VERR is lower than the sense voltage VSNS, the differential amplifier 14 outputs a current based on the current signal from the differential amplifier 14 toward the wiring WR2 so that a potential of the wiring WR2 increases. When the error voltage VERR is higher than the sense voltage VSNS, the differential amplifier 14 draws a current based on the current signal from the wiring WR2 toward the differential amplifier 14 so that the potential of the wiring WR2 decreases. As an absolute value of the difference between the error voltage VERR and the sense voltage VSNS increases, a magnitude of the current based on the current signal also increases.

The differential amplifier 15, like the error amplifier 11, is a current output type transconductance amplifier. The differential amplifier 15 outputs from its own output terminal a current signal corresponding to a source-drain voltage of the transistor M2 (a current flowing through the transistor M2). Charges generated by the current signal is output to a wiring WR3. Specifically, the differential amplifier 15 outputs a current based on the current signal from the differential amplifier 15 toward the wiring WR3 so that a potential of the wiring WR3 increases. As an absolute value of the source-drain voltage of the transistor M2 increases, a magnitude of the current based on the current signal also increases.

In the present embodiment, a current flowing through the inductor L1 is detected by detecting the current flowing through the transistor M2, but the current flowing through the inductor L1 may be detected by detecting a current flowing through the transistor M1. In addition, in the present embodiment, the current flowing through the transistor M2 is detected using an on-resistance of the transistor M2, but a sense resistor connected in series to the transistor M2 may be provided, and the current flowing through the transistor M2 may be detected using the sense resistor.

A DC bias voltage of the wiring WR3 is set by the DAC 16, the buffer amplifier 17, and the resistor 18. An analog voltage output from the DAC 16 becomes the DC bias voltage of the wiring WR3 via the buffer amplifier 17 and the resistor 18. The DC bias voltage of the wiring WR3 serves as a reference for a detection result of the current flowing through the transistor M2.

The voltage applied to the wiring WR3 is supplied to the buffer amplifier 19, and is output as the sense voltage VSNS from an output terminal of the buffer amplifier 19.

The ramp voltage generation circuit 20 generates a ramp voltage VRAMP having a voltage value that periodically changes by a predetermined PWM period. The PWM period corresponds to a reciprocal of a PWM frequency. The ramp voltage VRAMP has, for example, a triangular or sawtooth voltage waveform.

A comparison voltage VC on the wiring WR2 is supplied to a non-inverting input terminal of the comparator 21, and the ramp voltage VRAMP from the ramp voltage generation circuit 20 is supplied to an inverting input terminal of the comparator 21. The comparator 21 compares the comparison voltage VC with the ramp voltage VRAMP and outputs a pulse width modulated signal SPWM indicating the comparison result. The pulse width modulation signal SPWM is at a high level while the comparison voltage VC is higher than the ramp voltage VRAMP, and is at a low level while the comparison voltage VC is lower than the ramp voltage VRAMP.

The logic circuit 22 supplies gate signals G1 and G2, which are based on the pulse width modulated signal SPWM from the comparator 21, to the transistors M1 and M2, respectively, thereby generating a pulsed switch voltage VSW at a connection node between the transistors M1 and M2. Since the error amplifier 11 generates the current signal such that the feedback voltage VFB and the reference voltage VREF become equal to each other, the output voltage VOUT is stabilized at a predetermined target voltage according to the reference voltage VREF and a voltage division ratio by the feedback resistors R1 and R2.

Figure 3:
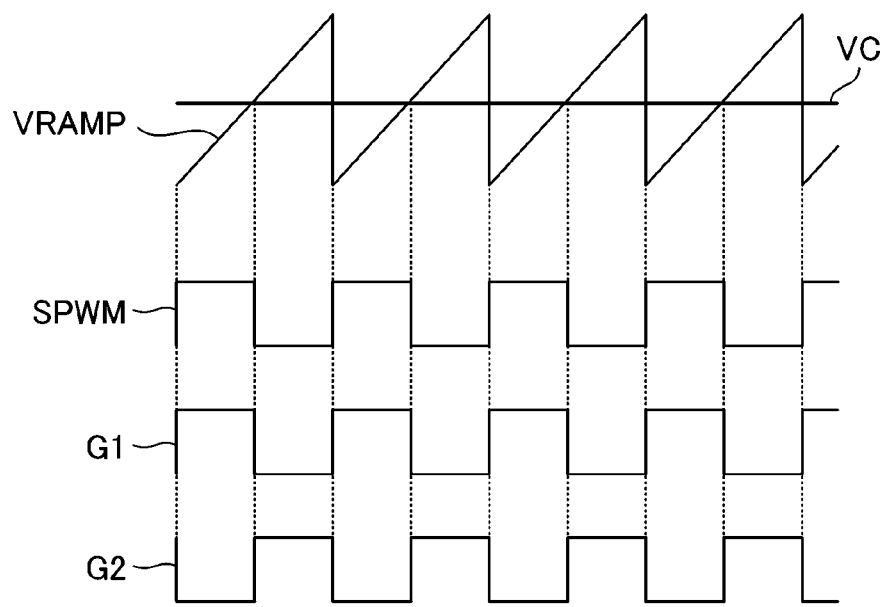
FIG. 3 is a waveform diagram in PWM control.

Basically, the comparison voltage VC is limited to be within a variation range of the ramp voltage VRAMP. When the comparison voltage VC is maintained within the variation range of the ramp voltage VRAMP, as shown in FIG. 3, a period during which the pulse width modulation signal SPWM is at a high level and a period during which the pulse width modulation signal SPWM is at a low level occur every PWM period, and PWM control is performed at the PWM frequency. In the PWM control, the transistors M1 and M2 are alternately turned on and off in the PWM period based on the pulse width modulation signal SPWM.

More specifically, in the PWM control, while the pulse width modulation signal SPWM is at the high level, a high-level gate signal G1 and a low-level gate signal G2 are supplied to gates of the transistors M1 and M2, respectively, and the transistors M1 and M2 are turned on and turned off, respectively. At this time, a current based on the input voltage VIN flows toward the output terminal OUT via the transistor M1 and the inductor L1. Conversely, in the PWM control, while the pulse width modulation signal SPWM is at the low level, a low-level gate signal G1 and a high-level gate signal G2 are supplied to the gates of the transistors M1 and M2, respectively, and the transistors M1 and M2 are turned off and turned on, respectively. At this time, a current based on stored energy of the inductor L1 flows through the transistor M2 and the inductor L1. In addition, in order to reliably prevent occurrence of a through current, a dead time during which both the transistors M1 and M2 are turned off may be provided between a period in which the transistor M1 is turned on and a period in which the transistor M2 is turned on.

In addition, the switching power supply IC 1 includes switches SW3 to SW5, a calibration circuit 23, a comparator 24, a control circuit 25, an oscillator 26, a delay circuit 27, and a constant voltage source 28.

When the switch SW3 is in an on state, the calibration circuit 23 receives the output of the differential amplifier 14 and supplies a digital voltage according to the output of the differential amplifier 14 to the DAC 16.

The switch SW4 is provided on the wiring WR1. A first end of the switch SW5 is connected to a connection node between the switch SW4 and a non-inverting input terminal of the buffer amplifier 13. A second end of the switch SW5 is connected to a positive electrode of the constant voltage source 28. A negative electrode of the constant voltage source 28 is connected to the ground. The switches SW4 and SW5 are an example of a selector that is configured to receive an error signal and a constant voltage output from the constant voltage source 28. In the switching power supply IC 1, which is a master, the selector selects the constant voltage output from the constant voltage source 28 during calibration and outputs it to a circuit in a subsequent stage (the non-inverting input terminal of the buffer amplifier 13).

A non-inverting input terminal of the comparator 24 is supplied with a voltage applied to the terminal PH. A constant voltage VDD/2 is supplied to an inverting input terminal of the comparator 24. The control circuit 25 determines whether the switching power supply IC 1 is a master or a slave based on an output voltage of the comparator 24. Specifically, when the output voltage of the comparator 24 is at a high level, the control circuit 25 determines that the switching power supply IC 1 is the master. On the other hand, when the output voltage of the comparator 24 is at a low level, the control circuit 25 determines that the switching power supply IC 1 is the slave.

In the present embodiment, since the constant voltage VDD is applied to the terminal PH of the switching power supply IC 1, the control circuit 25 of the switching power supply IC 1 determines that the switching power supply IC 1 is the master. On the other hand, in the present embodiment, since the ground voltage is applied to the terminal PH of the switching power supply IC 2, the control circuit 25 of the switching power supply IC 1 determines that the switching power supply IC 2 is the slave.

In the master switching power supply IC 1, the control circuit 25 turns the switch SW1 on, turns the switch SW2 on, turns the switch SW3 off, turns the switch SW4 on, and turns the switch SW5 off, as shown in FIG. 1, during non-calibration. In addition, the master switching power supply IC 1 operates based on a clock CLK1 supplied from the oscillator 26 of the master.

In the switching power supply IC 2, which is the slave, the control circuit 25 turns the switch SW1 off, turns the switch SW2 on, turns the switch SW3 off, turns the switch SW4 on, and turns the switch SW5 off, as shown in FIG. 1, during non-calibration. In addition, in the slave switching power supply IC 2, the switch SW4 may be turned off during non-calibration. Further, in the slave switching power supply IC 2, the switch SW5 may be turned on during non-calibration. In addition, the slave switching power supply IC 2 receives a second clock signal CLK2 of the master, which is a signal obtained by delaying the clock CLK1 generated by the master by a predetermined angular phase by the delay circuit 27 of the master, via the terminal CLKOUT of the master and the terminal SYNC of the slave. The slave switching power supply IC 2 operates based on the second clock signal CLK2 of the master. Thus, it is possible for the slave to operate in synchronization with the master.

As described above, during non-calibration, the switches SW1 and SW2 of the master switching power supply IC 1 are turned on, the switch SW1 of the slave switching power supply IC 2 is turned off, and the switch SW2 of the slave switching power supply IC 2 is turned on. As a result, the error voltage VERR of the master switching power supply IC 1 is supplied to an inverting input terminal of the differential amplifier 14 of the slave switching power supply IC 2. Accordingly, the slave switching power supply IC 2 executes control based on an error signal corresponding to the difference between the feedback voltage VFB and the reference voltage VREF of the master switching power supply IC 1. In addition, the master switching power supply IC 1 executes control based on an error signal corresponding to the difference between the feedback voltage VFB and its own reference voltage VREF. Since the power supply system SYS1 uses the reference voltage VREF of the master switching power supply IC 1 in both the switching power supply ICs 1 and 2, it is possible to improve efficiency during no-load and to suppress uneven heat generation between the switching power supply ICs 1 and 2.

However, when there is an offset in the detection result of the current flowing through the transistor M2, the offset will impede the improvement of efficiency during no-load and the suppression of uneven heat generation between the switching power supply ICs 1 and 2. Therefore, the power supply system SYS1 performs calibration to cancel the offset.

Figure 4:
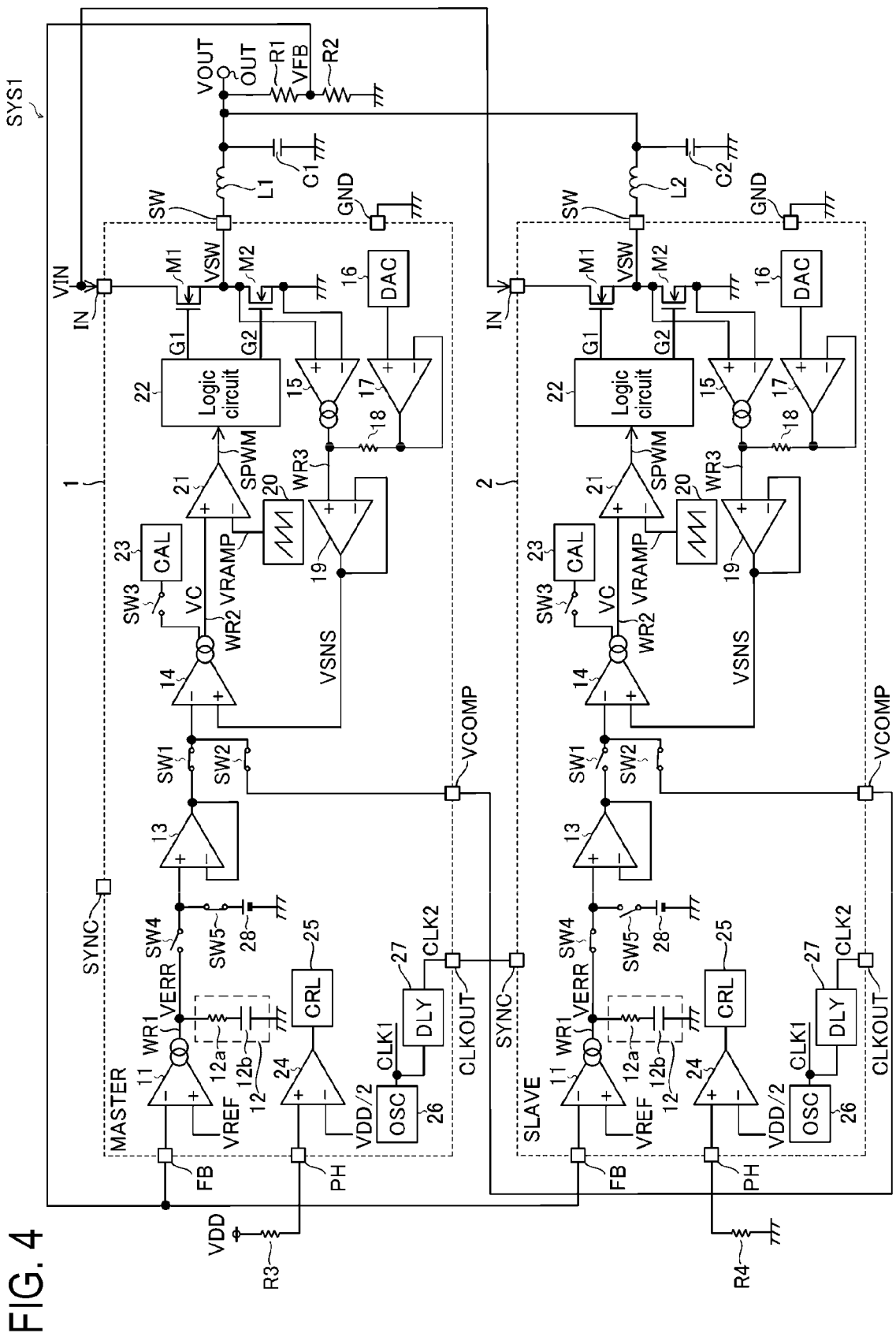
FIG. 4 is a diagram showing states of switches during calibration.

In the master switching power supply IC 1, the control circuit 25 turns the switch SW1 on, turns the switch SW2 on, turns the switch SW3 off, turns the switch SW4 off, and turns the switch SW5 on, as shown in FIG. 4, during calibration. In addition, the master switching power supply IC 1 operates based on the clock CLK1 supplied from the oscillator 26 of the master during calibration, as well as during non-calibration.

In the slave switching power supply IC 2, the control circuit 25 turns the switch SW1 off, turns the switch SW2 on, turns the switch SW3 off, turns the switch SW4 on, and turns the switch SW5 off, as shown in FIG. 4, during calibration. In addition, in the slave switching power supply IC 2, the switch SW4 may be turned off during calibration. Further, in the slave switching power supply IC 2, the switch SW5 may be turned on during calibration. In addition, the slave switching power supply IC 2 operates based on the second clock signal CLK2 of the master during calibration, as well as during non-calibration.

As described above, during calibration, the switch SW1 of the master switching power supply IC 1 is turned off, and the switches SW2 and SW3 of the master switching power supply IC 1 are turned on. As a result, during calibration, the master switching power supply IC 1 calibrates a first reference of the sensing result of the current flowing through the transistor M2 of the master switching power supply IC 1, with respect to a voltage supplied to the non-inverting input terminal of the buffer amplifier 13 of the master switching power supply IC 1. In addition, during calibration, the voltage supplied to the non-inverting input terminal of the buffer amplifier 13 of the master switching power supply IC 1 is a constant voltage output from the constant voltage source 28.

Specifically, during calibration, the constant voltage output from the constant voltage source 28 of the master switching power supply IC 1 is supplied to the non-inverting input terminal of the buffer amplifier 13 of the master switching power supply IC 1. In this state, the calibration circuit 23 of the master switching power supply IC 1 changes a value of the digital voltage supplied to the DAC 16 of the master switching power supply IC 1, and monitors logical switching of the differential amplifier 14 of the master switching power supply IC 1. In addition, when detecting the logical switching of the differential amplifier 14, the calibration circuit 23 of the master switching power supply IC 1 fixes the value of the digital voltage supplied to the DAC 16 at a value either immediately before or immediately after the logical switching of the differential amplifier 14.

As a result, the master switching power supply IC 1 can calibrate all of an offset current of the differential amplifier 15 generated in the master switching power supply IC 1, offsets of the buffer amplifiers 17 and 19, and an offset of the differential amplifier 14, with respect to the voltage supplied to the non-inverting input terminal of the buffer amplifier 13 of the master switching power supply IC 1.

As described above, during calibration, the switches SW1 and SW3 of the slave switching power supply IC 2 are turned off, and the switch SW2 of the slave switching power supply IC 2 is turned on. As a result, during calibration, the slave switching power supply IC 2 calibrates a second reference of the sensing result of the current flowing through the transistor M2 of the slave switching power supply IC 2, with respect to a voltage supplied to the non-inverting input terminal of the buffer amplifier 13 of the master switching power supply IC 1. In addition, during calibration, the voltage supplied to the non-inverting input terminal of the buffer amplifier 13 of the master switching power supply IC 1 is a constant voltage output from the constant voltage source 28, as described above.

Specifically, during calibration, the voltage output from the buffer amplifier 13 of the master switching power supply IC 1 is supplied to the inverting input terminal of the differential amplifier 14 of the slave switching power supply IC 2. In this state, the calibration circuit 23 of the slave switching power supply IC 2 changes a value of the digital voltage supplied to the DAC 16 of the slave switching power supply IC 2, and monitors logical switching of the differential amplifier 14 of the slave switching power supply IC 2. In addition, when detecting the logical switching of the differential amplifier 14, the calibration circuit 23 of the slave switching power supply IC 2 fixes the value of the digital voltage supplied to the DAC 16 at a value either immediately before or immediately after the switching of the logic of the differential amplifier 14.

As a result, the slave switching power supply IC 2 can calibrate all of an offset current of the differential amplifier 15 generated in the slave switching power supply IC 2, offsets of the buffer amplifiers 17 and 19, and an offset of the differential amplifier 14, with respect to the voltage supplied to the non-inverting input terminal of the buffer amplifier 13 of the master switching power supply IC 1.

When switching from calibration to non-calibration, the voltage supplied to the non-inverting input terminal of the buffer amplifier 13 of the master switching power supply IC 1 is switched from the constant voltage output from the constant voltage source 28 to the error voltage VERR output from the differential amplifier 14 of the master switching power supply IC 1. In other words, even during non-calibration, the master switching power supply IC 1 and the slave switching power supply IC 2 commonly use the voltage supplied to the non-inverting input terminal of the buffer amplifier 13 of the master switching power supply IC 1. Therefore, in the power supply system SYS1, since the above-described calibration does not impede the improvement of efficiency during no-load and the suppression of uneven heat generation between the switching power supply ICs 1 and 2, the efficiency during no-load can be improved, and the uneven heat generation between the switching power supply ICs 1 and 2 can be suppressed.

Figure 5:
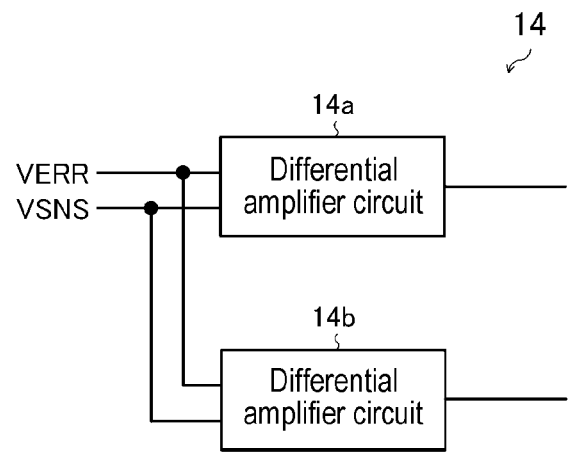
FIG. 5 is a diagram showing a schematic configuration of a differential amplifier.

The power supply system SYS1 attempts to reduce a time required for calibration by configuring the differential amplifier 14 as shown in FIG. 5. The differential amplifier 14 shown in FIG. 5 includes a pair of differential amplifier circuits 14a and 14b configured to amplify the difference between the error voltage VERR and the sense voltage VSNS. The differential amplifier circuit 14a and the differential amplifier circuit 14b have the same circuit configuration. Each of the master switching power supply IC 1 and the slave switching power supply IC 2 uses the differential amplifier circuit 14a to control the transistors M1 and M2 and uses the differential amplifier circuit 14b for calibration. Since the comparator 21 and the like are connected to a rear stage of the differential amplifier circuit 14a, responsiveness of the differential amplifier circuit 14a deteriorates by RC circuits in the comparator 21 and the like. On the other hand, the differential amplifier circuit 14b has good responsiveness because it is not affected by the RC circuits in the comparator 21 and the like. Therefore, even when the analog voltage output from the DAC 16 changes at a high speed, the differential amplifier circuit 14b can respond.

Others

In addition, the configuration of the present disclosure can be modified in various ways other than the above-described embodiment without departing from the spirit of the disclosure. The above-described embodiment should be considered to be illustrative in all respects and not restrictive, and the technical scope of the present disclosure is indicated by the claims rather than the description of the above-described embodiment. It should be understood that all changes that come within the meaning and range of equivalents of the claims are included in the technical scope of the present disclosure.

For example, in the above-described embodiment, there is one slave, but there may be two or more slaves.

For example, in the above-described embodiment, the feedback voltage VFB is the divided voltage of the output voltage VOUT, but the feedback voltage VFB may be the output voltage VOUT itself.

Supplementary Notes

Supplementary Notes are provided for the present disclosure in which specific configuration examples are shown in the above-described embodiment.

A power supply system (SYS1) according to the present disclosure has a configuration (first configuration) that the power supply system includes a plurality of semiconductor integrated circuit devices (1, 2), each of which has an error amplifier (11) configured to output an error signal corresponding to a difference between a feedback voltage, which is based on an output voltage, and a reference voltage, and is configured to control a switching element (M2) based on the error signal and a current flowing through the switching element, wherein a master among the plurality of semiconductor integrated circuit devices is configured to perform control based on the error signal corresponding to the difference between the feedback voltage and its own reference voltage, wherein a slave among the plurality of semiconductor integrated circuit devices is configured to perform control based on the error signal corresponding to the difference between the feedback voltage and the reference voltage of the master, and wherein during calibration, the master is further configured to use a constant voltage to calibrate a first reference of a detection result of the current flowing through its own switching element, and the slave is further configured to use the constant voltage supplied from the master to calibrate a second reference of a detection result of the current flowing through its own switching element.

According to the power supply system having the first configuration, the constant voltage of the master is used in the plurality of semiconductor integrated circuit devices, and thus variations in the reference of the detection result of the current flowing through the switching element is suppressed among the plurality of semiconductor integrated circuit devices. Therefore, it is possible to improve efficiency during no-load and to suppress uneven heat generation among the plurality of semiconductor integrated circuit devices.

The power supply system of the first configuration may have a configuration (second configuration) that the constant voltage is different from the error signal of each of the master and the slave.

The power supply system of the second configuration may have a configuration (third configuration) that each of the plurality of semiconductor integrated circuit devices further has a constant voltage source (28) configured to output the constant voltage, and a selector (SW4, SW5) configured to receive the error signal and the constant voltage, and the selector of the master is configured to select and output the constant voltage during the calibration.

The power supply system of any one of the first to third configurations may have a configuration (fourth configuration) that each of the plurality of semiconductor integrated circuit devices further has a first terminal (VCOMP), and the master is further configured to separately output the constant voltage and the error signal from its own first terminal.

According to the power supply system having the fourth configuration, since it is not necessary to separately provide a terminal for outputting a voltage for calibration and a terminal for outputting an error signal in the master, the number of terminals can be reduced.

The power supply system of the fourth configuration may have a configuration (fifth configuration) that the slave is further configured to separately receive the constant voltage and the error signal of the master at its own first terminal.

According to the power supply system having the fifth configuration, since it is not necessary to separately provide a terminal for receiving a voltage for calibration and a terminal for receiving an error signal in the slave, the number of terminals can be reduced.

The power supply system of any one of the first to fifth configurations may have a configuration (sixth configuration) that each of the plurality of semiconductor integrated circuit devices further has a determinator (24, 25) configured to determine whether it is the master or the slave.

According to the power supply system having the sixth configuration, the master semiconductor integrated circuit device and the slave semiconductor integrated circuit device can have the same circuit configuration.

The power supply system of the sixth configuration may have a configuration (seventh configuration) that the determinator is further configured to determine whether it is the master or the slave, based on a voltage applied from the outside.

According to the power supply system having the seventh configuration, it is possible to simply set each of the plurality of semiconductor integrated circuit devices as either a master or a slave.

The power supply system of any one of the first to seventh configurations may have a configuration (eighth configuration) that the master is further configured to operate based on a first clock signal, the master is further configured to generate a second clock signal, which is delayed by a predetermined angular phase from the first clock signal, and the slave is further configured to operate based on the second clock signal.

According to the power supply system having the eighth configuration, the slave can operate in synchronization with the master.

The power supply system of any one of the first to eighth configurations may have a configuration (ninth configuration) that each of the plurality of semiconductor integrated circuit devices further has a buffer amplifier (13) connected to an output terminal of the error amplifier.

According to the power supply system having the ninth configuration, a phase of the error voltage generated in the wiring that connects the output terminal of the error amplifier and the input terminal of the buffer amplifier becomes difficult to change.

The power supply system of any one of the first to ninth configurations may have a configuration (tenth configuration) that each of the plurality of semiconductor integrated circuit devices further has a differential amplifier (14) that includes a pair of differential amplifier circuits configured to amplify a difference between a voltage based on the error signal and the detection result of the current flowing through the switching element, and each of the plurality of semiconductor integrated circuit devices is further configured to use one of the pair of differential amplifier circuits to control the switching element and use the other of the pair of differential amplifier circuits for the calibration.

According to the power supply system having the tenth configuration, a time required for calibration can be reduced.

A semiconductor integrated circuit (1, 2) device according to the present disclosure has a configuration (eleventh configuration) that the semiconductor integrated circuit includes: an error amplifier (11) configured to output an error signal corresponding to a difference between a feedback voltage, which is based on an output voltage, and a reference voltage; and a controller (22) configured to control a switching element (M2) based on the error signal and a current flowing through the switching element, wherein when operating as a master, the semiconductor integrated circuit device is configured to perform control based on the error signal corresponding to the difference between the feedback voltage and its own reference voltage, and is further configured to use, during calibration, a constant voltage to calibrate a first reference of a detection result of the current flowing through its own switching element, and wherein when operating as a slave, the semiconductor integrated circuit device is configured to perform control based on the error signal corresponding to the difference between the feedback voltage and the reference voltage of another semiconductor integrated circuit device, and is further configured to use, during calibration, a constant voltage supplied from the another semiconductor integrated circuit device to calibrate a second reference of a detection result of the current flowing through its own switching element.

By using the plurality of semiconductor integrated circuit devices having the eleventh configuration, it is possible to implement a power supply system capable of improving efficiency during no load and capable of suppressing uneven heat generation among the plurality of semiconductor integrated circuit devices.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A power supply system including a plurality of semiconductor integrated circuit devices, each of which has an error amplifier configured to output an error signal corresponding to a difference between a feedback voltage, which is based on an output voltage, and a reference voltage, and is configured to control a switching element based on the error signal and a current flowing through the switching element,
  wherein a master among the plurality of semiconductor integrated circuit devices is configured to perform control based on the error signal corresponding to the difference between the feedback voltage and its own reference voltage,
  wherein a slave among the plurality of semiconductor integrated circuit devices is configured to perform control based on the error signal corresponding to the difference between the feedback voltage and the reference voltage of the master, and
  wherein during calibration, the master is further configured to use a constant voltage to calibrate a first reference of a detection result of the current flowing through its own switching element, and the slave is further configured to use the constant voltage supplied from the master to calibrate a second reference of a detection result of the current flowing through its own switching element.

2. The power supply system of claim 1, wherein the constant voltage is different from the error signal of each of the master and the slave.

3. The power supply system of claim 2, wherein each of the plurality of semiconductor integrated circuit devices further has a constant voltage source configured to output the constant voltage, and a selector configured to receive the error signal and the constant voltage, and
  wherein the selector of the master is configured to select and output the constant voltage during the calibration.

4. The power supply system of claim 1, wherein each of the plurality of semiconductor integrated circuit devices further has a first terminal, and
  wherein the master is further configured to separately output the constant voltage and the error signal from its own first terminal.

5. The power supply system of claim 4, wherein the slave is further configured to separately receive the constant voltage and the error signal of the master at its own first terminal.

6. The power supply system of claim 1, wherein each of the plurality of semiconductor integrated circuit devices further has a determinator configured to determine whether it is the master or the slave.

7. The power supply system of claim 6, wherein the determinator is further configured to determine whether it is the master or the slave, based on a voltage applied from the outside.

8. The power supply system of claim 1, wherein the master is further configured to operate based on a first clock signal,
wherein the master is further configured to generate a second clock signal, which is delayed by a predetermined angular phase from the first clock signal, and
wherein the slave is further configured to operate based on the second clock signal.

9. The power supply system of claim 1, wherein each of the plurality of semiconductor integrated circuit devices further has a buffer amplifier connected to an output terminal of the error amplifier.

10. The power supply system of claim 1, wherein each of the plurality of semiconductor integrated circuit devices further has a differential amplifier that includes a pair of differential amplifier circuits configured to amplify a difference between a voltage based on the error signal and the detection result of the current flowing through the switching element, and
wherein each of the plurality of semiconductor integrated circuit devices is further configured to use one of the pair of differential amplifier circuits to control the switching element and use the other of the pair of differential amplifier circuits for the calibration.

11. A semiconductor integrated circuit device comprising:
an error amplifier configured to output an error signal corresponding to a difference between a feedback voltage, which is based on an output voltage, and a reference voltage; and
a controller configured to control a switching element based on the error signal and a current flowing through the switching element,
wherein when operating as a master, the semiconductor integrated circuit device is configured to perform control based on the error signal corresponding to the difference between the feedback voltage and its own reference voltage, and is further configured to use, during calibration, a constant voltage to calibrate a first reference of a detection result of the current flowing through its own switching element, and
wherein when operating as a slave, the semiconductor integrated circuit device is configured to perform control based on the error signal corresponding to the difference between the feedback voltage and the reference voltage of another semiconductor integrated circuit device, and is further configured to use, during calibration, a constant voltage supplied from the another semiconductor integrated circuit device to calibrate a second reference of a detection result of the current flowing through its own switching element.

* * * * *